Patented Aug. 4, 1925.

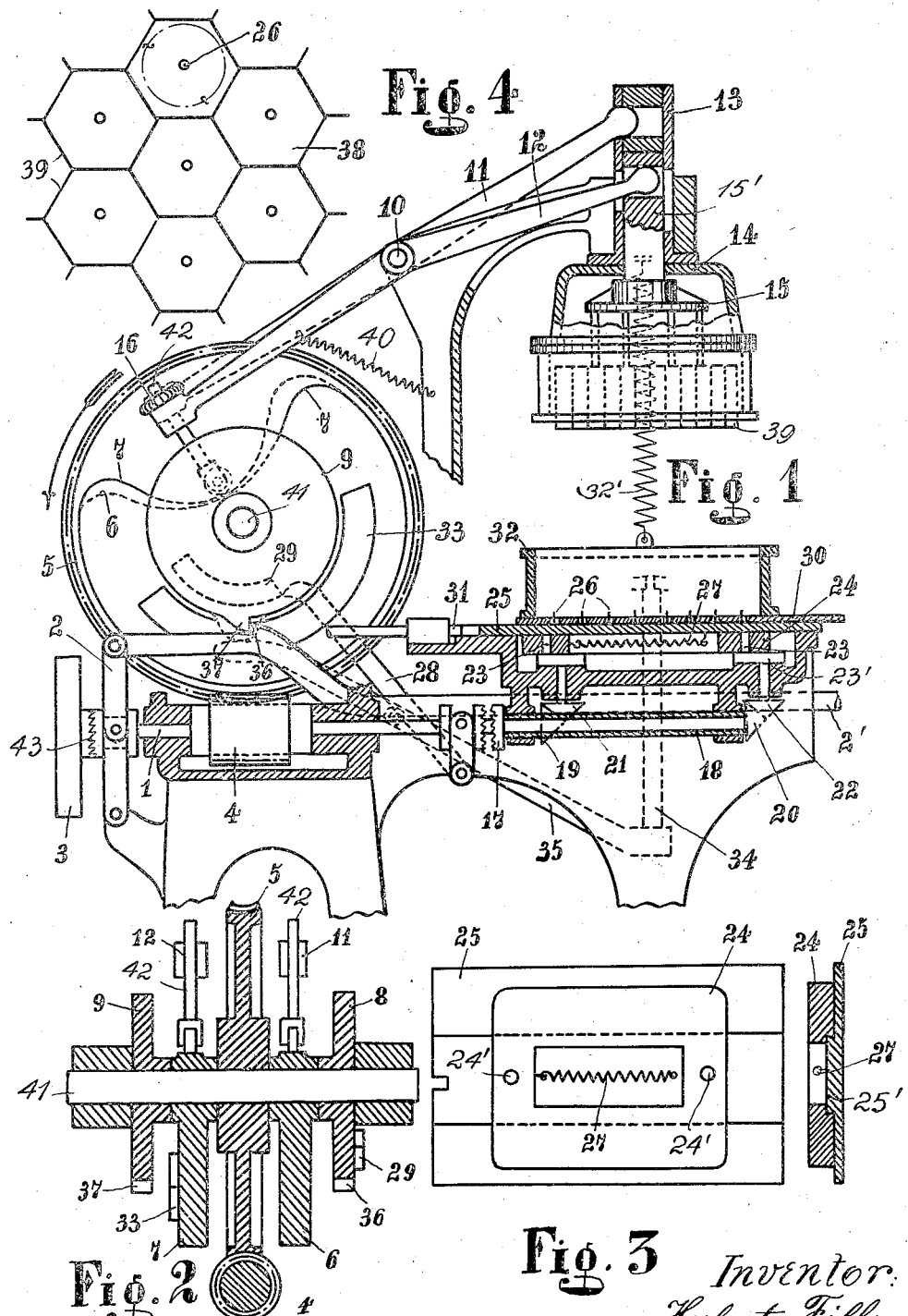

1,548,127

UNITED STATES PATENT OFFICE.

HUBERT FILBRY, OF AMMENDORF, NEAR HALLE-ON-THE-SAALE, GERMANY, ASSIGNOR TO "HABAMFA" HALLESCHE BACKEREI-MASCHINENFABRIK RAUSCH & FILBRY, OF AMMENDORF, NEAR HALLE-ON-THE-SAALE, GERMANY.

DOUGH DIVIDING AND WORKING MACHINE.

Application filed May 5, 1924. Serial No. 711,162.

*To all whom it may concern:*

Be it known that I, HUBERT FILBRY, a citizen of the German Republic, residing at Ammendorf, near Halle-on-the-Saale, Germany, have invented certain Improvements in Dough Dividing and Working Machines, of which the following is a specification.

This invention relates to a dough-dividing and working machine, and consists in the construction and combination of parts as hereinafter set forth and claimed, its object being to provide a simple and inexpensive machine which is compact and reliable in its operation.

Fig. 1 of the accompanying drawings represents a side view of the machine, partly in section, Fig. 2, an axial section of a cam shaft employed in the machine, Fig. 3, an inverted plan and a cross-section of the dough-working table, and Fig. 4, a diagrammatic plan of the dough dividers.

The machine has a dough-working table which is shown in detail in Fig. 3 and which is composed of a supporting and operating frame 24 and a plate 25, the latter being provided with a dovetailed fillet 25' whereby it is slidably guided in a corresponding recess in the frame 24. The frame 24 rests on two rotatable discs 23' and is controlled by crank pins 23 secured to the latter, the frame being provided with apertures 24' for engagement with the pins. Another plate 30, supported on the plate 25, receives the dough which is placed within a frame 32. The latter is guided vertically within the machine frame and suspended on springs 32' which tend to pull it away from the plate 30. A plurality of working pins 26 are connected to the plate 25 and brought up through apertures in the plate 30 for the purpose of working the dough. A presser head 14 is guided vertically in the machine frame by means of a tubular shank 13 above the frame 32, and another shank 15', guided within the shank 13, holds the dough divider 15. The latter is fitted with knives 39 which are connected in honeycomb fashion and which work in correspoding slots made in the presser head 14. The knives are normally flush with the presser face and are projected through the latter for cutting the dough. When thus projected, they form hexagonal cells 38 (Fig. 4) which determine the division of the dough. Double-armed levers 11 and 12 which rock about pivot pins 10, are engaged respectively, one to the shank 13 and the other to the shank 15' so as to control the position of the divider relative to the presser head and both relative to the working table. Springs 40 engage the opposite arms of the levers and hold them in engagement with cams 6 and 7 respectively, these cams being mounted on a shaft 41. The levers bear against the cams by means of rollers connected to spindles 42. The latter can be adjusted by means of milled wheels 16 for adjusting the position of the dough divider and presser relative to the working table and thus regulating the thickness of the dough sections.

The shaft 41 carries a worm wheel 5 through the medium of which it receives rotation from a worm 4 mounted on a shaft 1. The latter is the only operating shaft of the machine, and it receives motion from a pulley 3 when coupled to the same by means of a clutch 43. A pivoted arm 2 controls the clutch 43 and is itself controlled by a slide 2'. A disc 9 on the shaft 41 carries a tappet 37 which disengages the clutch 43 by engagement with the slide 2'. A sleeve 18 on the shaft 1 is fitted with bevel gears 19 and 20 which mesh with similar wheels 21 and 22 mounted on the shafts of the discs 23' for driving the cranks 23. The sleeve 18 receives motion from the shaft 1 to which it is coupled by means of a clutch 17. The latter is controlled by a lever 28 which co-operates with a cam segment 29 secured to one side of a disc 8 mounted on the shaft 41.

The plate 25 is controlled by a spring 27 which is arranged within the frame 24 and connected to the latter as well as to the plate. There is a pin 26 for each of the cells 38, and the spring 27 tends to hold the plate 25 so that the pins are in an eccentric position relative to the cells and will be moved by the cranks 23 in circles within the cells as indicated by the broken circular line in Fig. 4. Normally the plate 25 is supported and locked by a latch 31 so that the pins occupy a central position relative to the cells. The latch 31 cooperates with a cam segment 33 which is connected to the cam 7 and which controls the locking and the release of the plate 25.

The frame 32, when applied to the plate 30, is locked in this position by means of a shackle 34. The release of the frame is effected by means of a lever 35 which cooperates with a tappet 36 on the disc 8.

The modus operandi is as follows:

When the machine is started from the position shown in Fig. 1, the cams 6 and 7 act on the levers 11 and 12 so as to lower the dough divider and the presser head into the frame 32 on the plate 30. The dividing knives are first flush with the presser face, but are projected through the same so as to divide the dough layer as soon as the latter has been compressed and flattened to the predetermined thickness. When the dough layer has been divided by the knives, the plate 25 is released from the cam 33, and the sudden displacement of the plate and the pins 26, causes the dough sections to be loosened from the cell walls. At the same time the clutch 17 is operated so as to couple the cranks 23 to the operating shaft 1, and the dough sections will then be worked by the pins 26 against the angular side walls of the cells 38. When the lever 28 is released from the cam 29, the movement of the cranks 23 is interrupted and at the same time the plate 25 is centered and locked by the latch 31. Then the dividing knives are retracted into the presser head whereupon these elements are lifted out of the frame 32 by the cams 6 and 7. Finally the lever 35 will be actuated by the tappet 36 so as to release the frame 32 which is then lifted by its springs, leaving the dough sections behind on the table. At the same time the slide 2' is operated by the tappet 37 so as to arrest the movement of the shafts.

It will be observed that all the operations are controlled by a single operating shaft in cooperation with a cam shaft and a single transmission gear. This renders the machine very simple and compact and ensures a reliable functioning of the same.

I claim:

1. A dough-dividing and working machine comprising an operating shaft, a driving pulley arranged loosely on said shaft, a cam shaft, a worm gear for transmitting motion between the two shafts, a working table, a presser head arranged over said table, dough-dividing knives arranged adjustably in said head, a frame arranged between the presser head and the table to receive the dough, springs tending to lift the frame from the table, means for holding the frame against the table, cranks for imparting circular motion to the table in its own plane, and means operated by said cam shaft for coupling the operating shaft to the driving pulley, for applying the presser head and the knives to the table, for coupling the cranks to the operating shaft while the head is applied to the table, for disconnecting the couplings, and for releasing the frame from the working table, all during one revolution of the cam shaft.

2. A dough-dividing and working machine comprising an operating shaft, a driving pulley arranged loosely on said shaft, a cam shaft, a worm gear for transmitting motion between the two shafts, a working table having projecting dough-working pins, cranks for imparting circular motion to the table in its own plane, a presser head arranged over said table, dough-dividing knives arranged adjustably in said head, and means operated by said cam shaft for coupling the operating shaft to the driving pulley, for applying the presser head and the knives to the table, for coupling the cranks to the operating shaft while the head is applied to the table and for disconnecting the couplings during one revolution of the cam shaft.

3. A dough-dividing and working machine comprising an operating shaft, a driving pulley arranged loosely on said shaft, a cam shaft, a worm gear for transmitting motion between the two shafts, cranks for imparting circular motion to the table in its own plane, a presser head arranged over said table, a honeycomb-shaped dough divider guided in said head, pins connected to the working table so as to project into the cells of the divider when the head is applied to the table, and means operated by said cam shaft for coupling the operating shaft to the driving pulley, for applying the presser head and the divider to the table, for coupling the cranks to the operating shaft while the head is applied to the table so as to circulate the pins within the divider cells, and for disconnecting the couplings during one revolution of the cam shaft.

4. In a dough-dividing and working machine a working table, a presser head, dough-dividing knives guided in said head, a cam shaft, levers controlled by said cam shaft for adjusting the divider relative to the head and both relative to the working table, rollers connected to said levers so as to take the thrust of the cams, means for adjusting the position of the rollers relative to the levers so as to regulate the distance of the head from the working table.

HUBERT FILBRY.